(12) United States Patent
Knuuttila

(10) Patent No.: US 10,012,500 B2
(45) Date of Patent: Jul. 3, 2018

(54) STORING DATA FOR RE-MEASUREMENT OF OBJECTS USING A RECORDING MACHINE VISION SYSTEM

(75) Inventor: Antti Knuuttila, Klaukkala (FI)

(73) Assignee: OY MAPVISION LTD., Helsinki (FI)

( * ) Notice: Subject to any disclaimer, the term of this patent is extended or adjusted under 35 U.S.C. 154(b) by 1144 days.

(21) Appl. No.: 12/676,213

(22) PCT Filed: Sep. 3, 2008

(86) PCT No.: PCT/FI2008/050485
§ 371 (c)(1),
(2), (4) Date: Jul. 1, 2010

(87) PCT Pub. No.: WO2009/030813
PCT Pub. Date: Mar. 12, 2009

(65) Prior Publication Data
US 2010/0259608 A1    Oct. 14, 2010

(30) Foreign Application Priority Data

Sep. 3, 2007   (FI) ..................................... 20075604

(51) Int. Cl.
H04N 7/18      (2006.01)
G01B 21/04     (2006.01)

(52) U.S. Cl.
CPC ......... *G01B 21/042* (2013.01); *G01B 21/045* (2013.01)

(58) Field of Classification Search
None
See application file for complete search history.

(56) References Cited

U.S. PATENT DOCUMENTS

| | | | |
|---|---|---|---|
| 5,251,156 A | | 10/1993 | Heier et al. |
| 5,285,397 A | * | 2/1994 | Heier et al. .................. 702/167 |
| 6,356,671 B1 | | 3/2002 | Watanabe et al. |
| 6,597,806 B1 | * | 7/2003 | Kawada .................... 382/151 |
| 6,600,511 B1 | | 7/2003 | Kaneko et al. |

(Continued)

FOREIGN PATENT DOCUMENTS

| | | |
|---|---|---|
| DE | 102005043070 A | 3/2007 |
| EP | 1291617 A | 3/2003 |

(Continued)

OTHER PUBLICATIONS

Stephen R. Marschner et al., "Image-Based BRDF Measurement Including Human Skin," Program of Computer Graphics Cornell University, in Proceedings of 10th Eurographics Workshop on Rendering, pp. 139-152, Jun. 1999.*

(Continued)

*Primary Examiner* — Edemio Navas, Jr.
(74) *Attorney, Agent, or Firm* — Haug Partners LLP

(57) ABSTRACT

A method and a system for the quality control of objects after they have been supplied. After manufacturing, the object is checked by means of a measuring machine vision system. The measurement results of the machine vision system are recorded in a data system together with the corresponding calibration data. When the calibration data is known, new measurements can be conducted later from the recorded images at a time when the actual object has already been supplied and possibly placed in an end product.

9 Claims, 2 Drawing Sheets

(56) References Cited

U.S. PATENT DOCUMENTS

Figure 1:
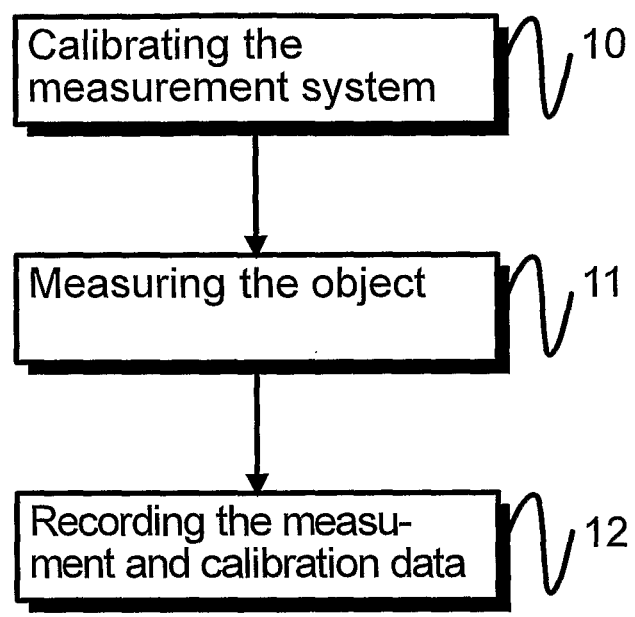

| | | | |
|---|---|---|---|
| 7,372,051 B2* | 5/2008 | Tsuneta | G01N 23/22 |
| | | | 250/306 |
| 2002/0076085 A1* | 6/2002 | Shimazu | 382/100 |
| 2002/0118893 A1* | 8/2002 | Nguyen | G01N 21/9515 |
| | | | 382/294 |
| 2003/0071194 A1* | 4/2003 | Mueller et al. | 250/208.1 |
| 2004/0066454 A1 | 4/2004 | Otani et al. | |
| 2004/0109245 A1* | 6/2004 | McClurg | G06K 9/00046 |
| | | | 359/833 |
| 2004/0202364 A1* | 10/2004 | Otani et al. | 382/154 |
| 2004/0215413 A1 | 10/2004 | Weldum et al. | |
| 2005/0012056 A1* | 1/2005 | Leikas | 250/559.19 |
| 2005/0151963 A1* | 7/2005 | Pulla et al. | 356/139.03 |
| 2006/0023938 A1* | 2/2006 | Ban et al. | 382/153 |
| 2006/0126903 A1* | 6/2006 | Sharony | 382/110 |
| 2007/0019083 A1* | 1/2007 | Nakashima | 348/239 |
| 2007/0154113 A1 | 7/2007 | Chang et al. | |
| 2007/0263924 A1* | 11/2007 | Kochi et al. | 382/154 |
| 2009/0009626 A1* | 1/2009 | Ko et al. | 348/231.3 |

FOREIGN PATENT DOCUMENTS

| | | | |
|---|---|---|---|
| JP | 2006162386 A | * | 6/2006 |
| WO | WO 02/086418 A | | 10/2002 |
| WO | WO 2005/124276 A | | 12/2005 |

OTHER PUBLICATIONS

Extended European Search Report issued in corresponding European Application No. 08787758 dated May 29, 2017.

* cited by examiner

STORING DATA FOR RE-MEASUREMENT OF OBJECTS USING A RECORDING MACHINE VISION SYSTEM

This application is a 371 filing of PCT/FI2008/050485 filed Sep. 3, 2008 and claims priority benefits from Finnish Patent Application No. 20075604 filed Sep. 3, 2007, the disclosure of which is hereby incorporated by reference.

FIELD OF THE INVENTION

The invention relates to the measuring technology and in particular to measuring objects by means of machine vision systems.

BACKGROUND OF THE INVENTION

A large number of measurements are conducted in conjunction with industrial production processes, in conjunction with the manufacture as well as with the quality control of an object. Traditionally, these measurements have been conducted by means of a coordinate measuring machine. In this type of system, the measuring system measures the desired points in the object by mechanical probing. Advantages of the traditional system include high accuracy and number of applications. The weakness of the measuring system resides in its slowness. Furthermore, such systems do not detect all deviations in the measured object. For example, in the case of measuring a hole made in the object, the hole is measured by probing a desired number of points on the circumference of the hole. If the object contains a defective section, it is detected only when the probe of the measuring device comes into contact with the defective section.

To solve this problem, different kinds of machine vision systems which perceive the object as a whole and are able to detect any deviating forms in the object have been developed. Particularly preferred machine vision systems are those in which the cameras and the indicating device of the measuring system are calibrated to the same measurement space. Preferably, this measurement space is three-dimensional. One such system is presented for example in patent publication WO02086418.

Use of the above-mentioned systems for quality control is particularly useful in the production-line industry where very large quantities of objects are being manufactured. In this kind of industry, the staff is not able to check each manufactured object. A similar need is also present in the industries which use these objects in their own products. For example, in the automobile industry, it is very important that the manufactured products are safe for the users. Consequently, the quality should be excellent. If a component is suspected as defective, this may lead to a check campaign in which vehicles are called for service in order to check certain parts. This is required specifically in cases where the part may suddenly break and cause a severe danger. Typically, such campaign is very expensive because it is not possible to limit the number of the defective parts precisely, but instead a larger number of possibly defective parts are checked for safety precautions than what is the actual number of the defective parts that were manufactured. Further, it is possible that the defect presents itself in such portion of the object that has not been measured in the production stage, for example because it has not been possible to conduct the measurement. For example, measuring the quality of welded seams by means of a machine vision system is known to be a difficult task.

Due to the above-mentioned features, there is an obvious demand for improved measuring systems which are able to solve the problems of the systems according to the known technology and thereby improve the reliability of the measurement results and utilization of the measurement data.

SUMMARY OF THE INVENTION

The objective of the invention is to disclose a new type of measuring system which can be used for conducting new measurements for previously measured objects without a new physical measuring event.

The present measuring system utilizes the calibrated machine vision system according to the known technology. The system is capable of recording the measurement images and the calibration data of the measuring system. Instead of the calibration data, also the data required for calculating the actual calibration data can be recorded. This data is stored in a database from where it can later be retrieved if new measurements are required. In conducting new measurements, the images captured by the measuring system and the calibration data are combined so that new measurements can be conducted. It is possible to program the measurements as a batch run, so that even quite large numbers of objects can be re-measured or that new properties or items in the objects can be measured.

In one embodiment according to the invention, the method according to the invention is applied in a measuring machine vision system in order to measure an object, the machine vision system being calibrated to a measurement space. The object may be provided with a unique identifier. The system comprises a camera system comprising at least two cameras and a data system connected to said camera system. The invention is characterized in that the system is arranged to measure the object with the camera system, to record the images in the data system and to associate the calibration data of the measurement event in question with said recorded images. In one embodiment according to the invention, the system comprises further an indicating device calibrated to the same measurement space as said camera system.

In one embodiment according to the invention, the system comprises further a data warehouse for storing said images and the corresponding measurement events.

In one embodiment according to the invention, the measuring system is arranged to self-calibrate after each measurement. The system is typically calibrated to a three-dimensional measurement space.

In one embodiment according to the invention, the measuring system is further arranged to re-measure the object based on the recorded images and the calibration data of the measurement event. By re-measuring the objects, it is possible to conduct the desired measurements all over again. These may include the same measurements as in the original measurement or completely new properties. Repeating the same measurements may be advantageous in the case where the algorithms and technologies used for the measurement have developed to obtain better results.

The advantage of the present invention is the improvement of quality control of the objects by subsequent measurements. Typically, the objects are produced in large quantities and it is typical that in a large lot only part of the objects are defective. A traditional way of correcting the problem is to check all end products which contain parts of the defective lot. This is particularly important in products which may cause danger to the users. Examples of such products include vehicles and electrical devices. Defective parts in vehicles may cause for example traffic accidents, and defective parts in electrical devices may cause for example fires. If the parts and the end products are provided with a unique identifier, it will be possible to trace the defective items without the need for expensive screening inspections.

Since it is impossible to achieve perfect quality cost-effectively, there is an obvious need for a method and a system for cost-effectively ensuring the quality of the produced objects. Since the quality control systems are not perfect, there is a need for a system for ensuring the quality of the objects even after the object has been supplied. The present invention provides a solution to this problem.

LIST OF FIGURES

Figure 2:
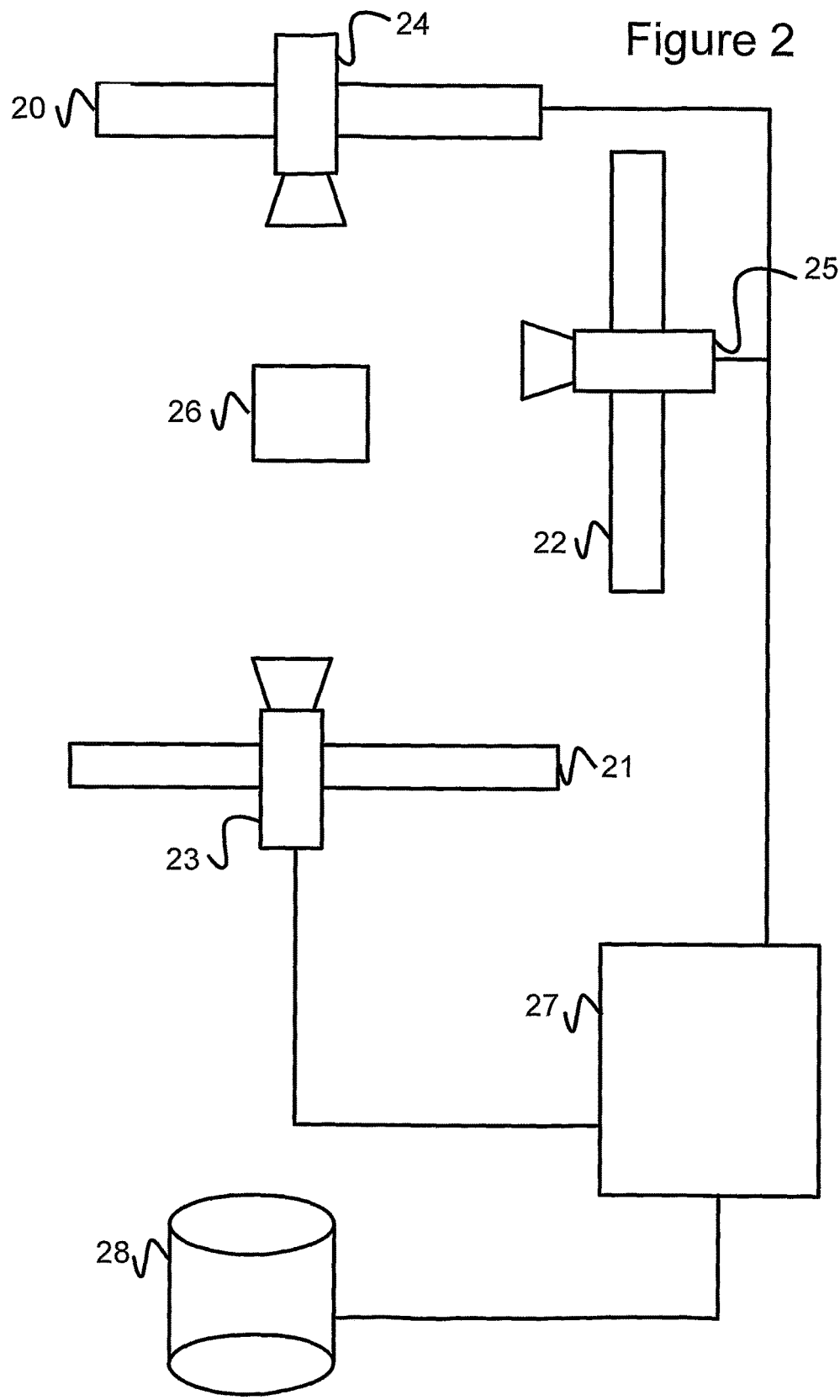

FIG. 1 presents one method according to the invention, and
FIG. 2 presents one system according to the invention.

DETAILED DESCRIPTION OF THE INVENTION

FIG. 1 presents one method according to the present invention. In using the system according to the present invention, the measuring system must be calibrated, step 10. There are different kinds of measuring systems and they can be calibrated in many different ways. For example, the measuring system may include a set of cameras and indicating devices or other illuminators. The system is typically calibrated to a three-dimensional measurement space but it can also be calibrated to any other kind of measurement space. From the standpoint of the present invention, the substantial feature is that all relevant calibration data can be recorded and associated with the measurement event. Calibration may be repeated at specific intervals or even between each measurement.

Once the system is calibrated, the actual measurement can be conducted, step 11. There are also many different kinds of measurement events. For example, if the system includes a large number of measuring cameras, only part of the cameras installed in the system can be used in certain measurements. This does not affect the accuracy of the measurement result, because, typically, all details to be measured are not visible for all cameras.

Finally, the conducted calibration data and the measurement results are recorded for archiving, step 12. The measurement results and the calibration data are recorded in such manner that the calibration data corresponding to each measurement event can be retrieved later. This can be done for example by creating an archive in which the corresponding calibration data is recorded in conjunction with each measurement result or, where it is not desirable to record the calibration data in conjunction with each measurement result, a reference system is created, and a reference to the calibration file is associated with the measurement, which reference is separately recorded in the data system. Typically, the measuring system is one that captures images by cameras, so the recorded measurement event data is a number of images. Information about which part of the measuring system has been used for capturing the images of the object and the corresponding calibration data or the reference to the calibration data may be associated with these images. If an indicating device, for example a laser indicator, is used in the measurement event, the data relating to the indicator may be recorded as well.

Measurement events obtained in the above-mentioned manner may be examined later. For example, if it is known that a specific production lot includes defective objects, the measurement events corresponding to the entire production lot may be inspected. Identification data must be associated with each object so that the object can later be traced using this identification data. For example, if the manufactured object is a crankshaft inserted in a vehicle, the manufacturer must associate with the crankshaft identification data which can be used for retrieving the measurement event of this particular crankshaft from the database. Then the object can be re-measured. For this information to be particularly useful, the car manufacturer must know in which vehicle this particular crankshaft has been inserted. If the crankshaft is found defective in the re-measurement, it has to be replaced. By utilizing the present invention, the replacement of the crankshaft may be directed to the specific vehicles which exhibit the defect. The same defect can be looked for in all crankshafts of the same production lot and all defective items can be called for replacement.

The method according to the present invention also enables such subsequent measurements which could not have been conducted by the measuring devices available at the time of the production. For example, measuring welded seams from an image is an extremely difficult task for the traditional machine vision measuring systems. With the progress of technology, measurements can be conducted more reliably, and it is possible that in the future, a defective welded seam may be detected in more reliable measurements. These defective welded seams may then be identified from the measurement events if the method according to the new technology is applied to all recorded measurement events. The method according to the present invention thus enables quality control of objects in such manner that the suspected objects need not be inspected physically, but instead, the defective items may be found from the recorded set of the measurement events by processing the measurement events with advanced measuring methods.

FIG. 2 presents one system according to the present invention. The system of FIG. 2 comprises a machine vision system with three cameras 23 to 25. The number of cameras varies according to application, but, typically, the measuring reliability may be improved by increasing the number of cameras. At present, the element limiting the number of cameras is the cost, so it is obvious that in the future, the systems include considerably more cameras. The cameras 23 to 25 are secured onto supports 20 to 22, respectively. The supports may be any structures which can be secured onto the support structures of the machine vision system as immovably as possible. The fixed structure which is not depicted herein may be for example a metal framework. In FIG. 2, images of an object 26 are captured by the cameras 23 to 25. The cameras 23 to 25 are further linked to a data system 27 in order to record the images and calculate the measurement event. The data system 27 may further be linked to other devices assisting in the measurement.

Typically, the data system 27 is further connected to a database server 28. This is advantageous because the database server 28 can be disposed more freely away from the industrial surroundings. Since a very large number of images and associated calibration data are recorded on the database server 28 according to the method presented in FIG. 1, the recording system used must be of high capacity. There are many different alternatives for recording systems, and the selection should be made according to the amount of data to be recorded. It is also possible to delete the recorded data. It is possible to connect the system for example to the service station and scrap yard data systems, so that the measurement data relating to a part can be deleted when the part or a final product is withdrawn from use. For example, in the case of the automobile industry, when the car is scrapped. On the other hand, it is also possible that the measurement events are recorded for example on tapes which are destroyed in full extent for example after ten years of archiving.

Since all actual measurement results are acquired from the material processed by the data system 27, the measurements may be later repeated using the same source material. The source material of a measurement event includes images captured by the cameras and the calibration data for the cameras, and possibly for other components, corresponding to the images. In this manner, all measurement events may be repeated for example by extracting the material from a tape and reprocessing each measurement event. The reprocessing may include repeating the original measurements with more advanced algorithms or conducting entirely new measurements based on the existing material. Typically, the re-measurements are conducted as a batch run, so that repeating the measurement events for all objects typically takes from a couple of hours to several days. The time required for repeating the measurement events naturally depends on the extent of the measurement material and the number of measured objects.

Calibration data refers to the parameters of the three-dimensional machine vision system which are used for conducting the measurement. These parameters may vary at different times due to changes in the mechanical structure of the system. This is why the calibration that was effective at the time of the measurement must be known when tracing and evaluating measurement results from the existing images.

Since the measuring machine vision system is able to measure all points visible in the camera images, objects that were ignored in earlier measurements may be measured later from the existing images. Here, too, calibration of this specific time is required.

Calibration methods are continuously developing. If the measurement images include suitable information, for example if the images show reference marks or other items positioned for this purpose, a new and improved calibration can be calculated using the existing images. In this manner, it is possible to obtain new and more accurate measurement results from the existing images. This kind of calibration correction may be assisted by the earlier calibration.

Typically, the recorded data includes the images used for the measurement and the calibration used during the measurement, or the measurement images alone under the condition that capturing the images is arranged so that the reference marks or other items required for the calibration are visible.

Typically, the calibration data in a three-dimensionally measuring machine vision system comprises the following parameters for each camera: 1) Position of the camera in the calibration space, i.e. the so-called external orientation: position X, Y, Z and rotations of the camera relative to spatial axes κ, φ, ω (kappa, phi, omega), 2) internal parameters of the camera for capturing the images, i.e. the so-called internal orientation: size of the image sensor and 3) position and image aberration data for the optics used, i.e. the so-called lens aberration parameters The above-mentioned division is one possible way of dividing the calibration data. However, it is possible to calculate other types of parametric series as well in which the terms are not directly linked to a physically measurable magnitude.

In addition to the actual calibration data, many other kinds of data relating to the structure of the system and to the measuring situation and which is not disclosed by the images may be recorded if necessary. This includes e.g. the measuring temperature, temperature coefficients for the materials, the absolute lighting values etc. All this history data combined makes it possible to conduct new measurements, evaluate and even retrospectively improve the existing results.

The invention is not limited merely to the exemplifying embodiments referred to above; instead, many variations are possible within the scope of the inventive idea defined by the claims.

The invention claimed is:

1. A method for measuring an object produced in a large lot by an industrial production process, the method comprising:
    employing a set of cameras to calibrate the system to a measurement space, wherein the measurement space is a three-dimensional space;
    recording calibration data and associating the calibration data with a measurement event at a first time;
    recording calibration data and associating the calibration data with the measurement event at a second time, the second time different from the first time;
    capturing images of an object in the measurement space with the set of cameras in the calibrated system, the object including an automobile part and having a unique identifier;
    recording data from the captured image in the measurement event in a data system;
    storing the recorded calibration data from the first time within first recorded object image data; and
    storing the recorded calibration data from the second time within second recorded object image data,
    measuring the object at the first time based on the captured image and the calibration data and re-measuring the object at a second time after the measurement event based on the same captured image and calibration data, wherein re-measuring the object is triggered by a defective object that is produced by the same large lot,
    wherein said calibration data comprises at least one of (a) position of the camera in the three-dimensional space, (b) rotations of the camera relative to spatial axes, (c) internal parameters of the camera for capturing the images and, (d) position and image aberration data for optics used, and
    wherein the method measures all points visible in the images captured by the cameras, such that features which were ignored in earlier measurements are available to be measured at a later time from existing images.

2. The method according to claim 1, wherein the set of cameras comprises at least two cameras.

3. The method according to claim 1, wherein an indicating device is calibrated for the measuring system.

4. The method according to claim 1, further comprising conducting new measurements of additional features of the object using the recorded image data and the calibration data of the measurement event.

5. The method according to claim 1, further comprising conducting new measurements of the object based on advanced measuring techniques using the recorded image data and the calibration data of the measurement event.

6. The method according to claim 1, further comprising conducting new measurements of the object based on improved calibration of the measurement space using the recorded image data and the calibration data of the measurement event.

7. The method according to claim 1, wherein recording of the image data include recording identification data of the object.

8. The method according to claim 1, wherein captured images and calibration data are recorded in a manner that the calibration data corresponding to each image can be retrieved for re-measurement of the object.

9. The method according to claim 1, wherein the recorded calibration data at the first time is different from the recorded calibration data at the second time.

* * * * *